UNITED STATES PATENT OFFICE.

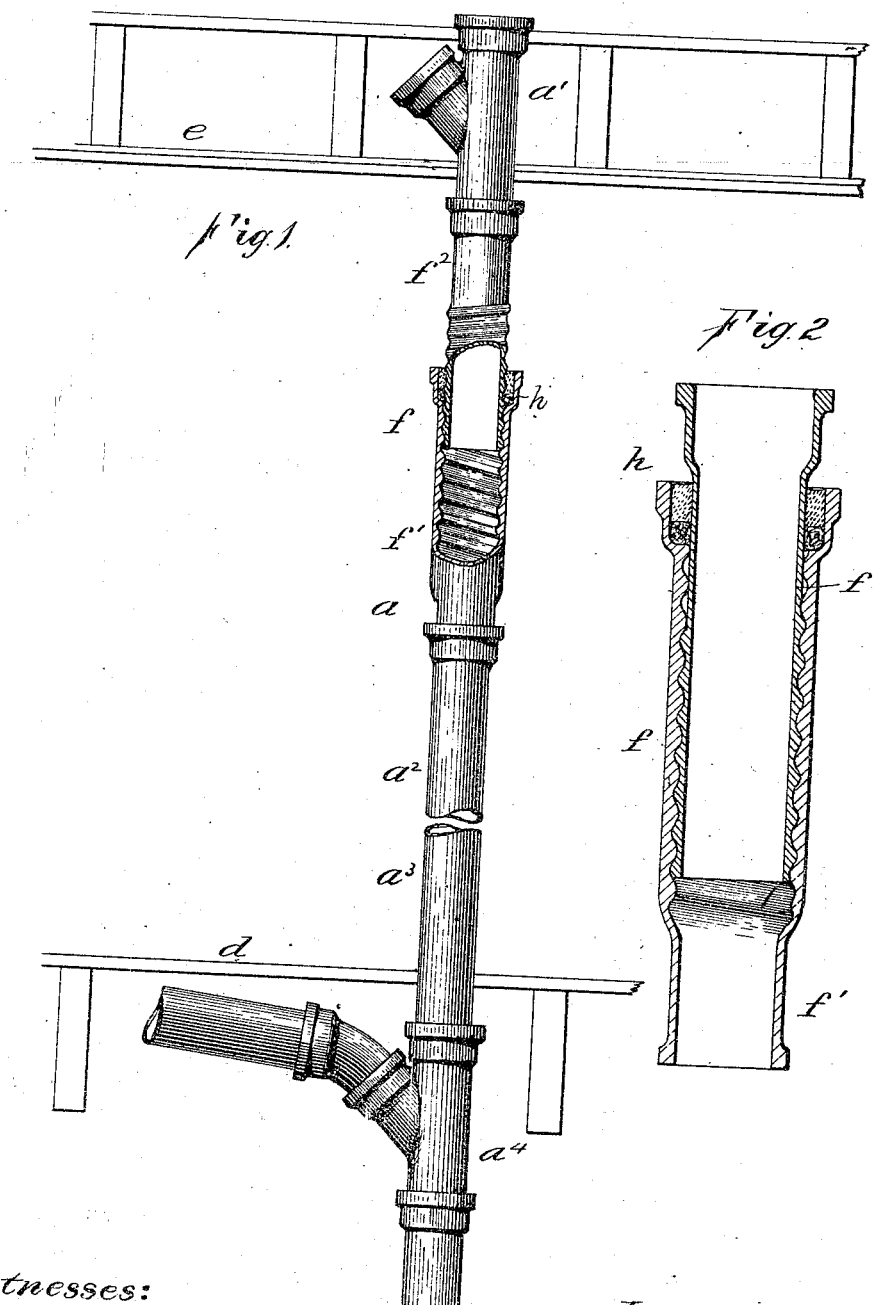

WILLIAM VANDERMAN, OF WILLIMANTIC, CONNECTICUT.

EXPANSION-COUPLING FOR PIPES.

SPECIFICATION forming part of Letters Patent No. 655,033, dated July 31, 1900.

Application filed May 14, 1900. Serial No. 16,592. (No model.)

*To all whom it may concern:*

Be it known that I, WILLIAM VANDERMAN, a citizen of the United States, and a resident of Willimantic, in the county of Windham and State of Connecticut, have invented certain new and useful Improvements in Expansion-Couplings for Sewer, Waste, and Drain Pipes, of which the following is a specification.

My invention relates to the class and style of pipes which are used in connection with the plumbing of buildings; and the objects are to provide a device which will enable such pipes to be fitted in place between fixed limits as to space allowed and also to provide means for making repairs in lines of such pipes without damage to the line.

Referring to the drawings forming part hereof, Figure 1 is a diagram view of part of a system of pipes in the plumbing of a building. Fig. 2 is a view, on an enlarged scale, of my improved coupling, with parts broken away to show construction.

The greater part of the large pipes used in plumbing in buildings at the present time are of cast-iron, especially in the sizes from two-inch up, which are used for drain, waste, and sewer mains, and they come in regular lengths, with hub and spigot ends for forming joints. Such a pipe is brittle and difficult to shorten, as frequently must be done in piping a building, as there is no way of controlling the direction or extent of the fracture in breaking off a piece.

It often happens that a line of pipe must be continued between two fixed parts of piping by the insertion of one or more lengths, and no effective means of doing this with the old means at hand so as to make a workman-like job or a thoroughly-packed and close joint between the sections is known.

In the accompanying drawings, the letter $a$ denotes a waste-pipe made up of the sections $a'$ $a^2$ $a^3$ and forming part of the system of plumbing in a building. From the floor $d$ to the ceiling $e$ is a distance which is not a multiple of any of the regular pipe-sections, although varying from it a few inches only. The section $a'$ shows only a small part of the spigot end and the section $a^4$ the hub end of a length of pipe, these two sections being fixed with respect to each other clear of the ceiling. In this case a section which is capable of extension or contraction for a few inches would enable the line of pipe to be completed. This extensible section $f$ embodies my invention in the two-part construction united by interengaging threaded parts. The part $f'$ has a spigot end, a hub end, and an enlargement within which a thread, preferably of steep pitch, is formed, and the part $f^2$ has a spigot end provided with an exterior thread which fits within the threaded socket part. These two parts $f'$ $f^2$ are capable of relative movement on each other, so as to change in total length a distance about equal to the threaded part on either member.

In Fig. 2 the sectional view illustrates the manner and means of packing the joint $h$ between the two sections as soon as the extreme ends have their proper bearings in the ends of the pipe sections which are connected by this coupling. Into this joint $h$, at the hub end of the section $f'$, a packing of oakum is forced, and onto this the melted lead is poured and then compacted in the usual manner.

It will be seen that this coupling device preserves the full inside area of the pipe by providing an enlargement where the threaded part is located between the spigot end and the hub end of this socket-section of the coupling and that in any line of piping in which this device is located any section in which any leak or defect exists can be removed by first melting the lead packing at the joint $h$ and taking out the coupling-section. The parts can be all replaced in a workman-like manner and a perfectly-tight joint formed either in a waste-pipe, an air-pipe, or in whatever place or position the expansible coupling may be located.

The advantages of this device and its ready adaptability to new or repair work are manifest and large. For instance, in any old line of waste-pipe where a leak may appear or any other reason may exist for the removal of a section the hub end of the section may be broken, the joint with the next sections broken, and the part desired removed. Under the old method the way in which a new section is inserted in this gap is by loosening up all the sections at the joints between the fixed ends or points and then building up the section on the lower fixed point as the hub of a pipe at the floor and arranging each section at an angle with the general line of the piping, with alternate sections slanting in opposite directions across the line, the spigot ends resting in the hubs to a slight extent and then forcing all the several sections into alinement at once and packing the joints. By the use of my improved coupling the gap may be filled by shortening the distance between the extreme ends by screwing one part into the other until the sections can be slipped sidewise into place without disturbing the other sections. The parts are then turned one within the other until the coupling is extended and the length or section united to the line of pipe by the interengagement of the respective hub and spigot ends.

A further advantage of my improvement is its applicability to all situations in any part of a straight length of piping, and the fact that in ordering pipe from measurements from plans allowance can be made for irregular lengths and all the needed pipe ordered ready to put together in the building without any cutting of sections on the job.

The improved joint when in place in a line of piping on new work can be utilized to adjust and take up any change due to settlement of the building, and this forms a still further advantage.

It is obvious that my invention is applicable to pipes of different diameter and irrespective of the uses of the pipe in the system of plumbing.

What I claim as my invention, and desire to secure by Letters Patent, is—

1. In combination in an expansible pipe-coupling, a section having a spigot end, a hub end and a threaded enlargement between these parts, and a second section having its spigot end threaded, and a hub end.

2. In combination in an expansible pipe-coupling, a section having a spigot end, a hub end for the reception of a packing, a threaded part located between these ends, and a second section having its spigot end threaded to fit the thread on the opposite section, and a packing located in the hub end of the first-mentioned section, to pack the joint between the two sections.

3. In combination in an expansible pipe-coupling, two telescoping sections, the socket-section having a spigot end, an enlarged hub end and a threaded inner surface between the ends, and an inner section having a threaded spigot end and a hub end.

WILLIAM VANDERMAN.

Witnesses:
CHAS. L. BURDETT,
ERMA P. COFFRIN.